(12) United States Patent
Williams et al.

(10) Patent No.: US 8,828,229 B2
(45) Date of Patent: Sep. 9, 2014

(54) DISTRIBUTED FACULTATIVE BACTERIA WATER TREATMENT SYSTEM WITH MEMBRANE BIOLOGICAL REACTOR PACKAGE PLANT AUGMENTATION

(75) Inventors: John Williams, Wheaton, IL (US); Daniel R. Williamson, Jr., Wheaton, IL (US); J. Rodney Dickerson, Homer, LA (US); Guy Marchesseault, Boxford, MA (US); Robert C. Fischer, Wallis, TX (US)

(73) Assignee: In-Pipe Technology, Inc., Wheaton, IL (US)

( * ) Notice: Subject to any disclaimer, the term of this patent is extended or adjusted under 35 U.S.C. 154(b) by 132 days.

(21) Appl. No.: 13/252,832

(22) Filed: Oct. 4, 2011

(65) Prior Publication Data
US 2012/0085703 A1    Apr. 12, 2012

Related U.S. Application Data

(60) Provisional application No. 61/389,550, filed on Oct. 4, 2010.

(51) Int. Cl.
| | | |
|---|---|---|
| *C02F 11/12* | (2006.01) | |
| *B01D 61/12* | (2006.01) | |
| *C02F 3/34* | (2006.01) | |
| *C02F 3/30* | (2006.01) | |
| *C02F 1/32* | (2006.01) | |

(52) U.S. Cl.
CPC ......... *C02F 2/1268* (2013.01); *C02F 2209/005* (2013.01); *C02F 3/348* (2013.01); *C02F 2305/06* (2013.01); *C02F 3/302* (2013.01); *C02F 1/32* (2013.01)
USPC ............................ 210/609; 614/620; 614/920

(58) Field of Classification Search
None
See application file for complete search history.

(56) References Cited

U.S. PATENT DOCUMENTS

| 5,326,459 A | 7/1994 | Hlavach et al. |
|---|---|---|
| 5,372,712 A | 12/1994 | Petit |
| 5,425,874 A | 6/1995 | Gass |

(Continued)

FOREIGN PATENT DOCUMENTS

| WO | WO 2008093287 A1 * | 8/2008 | ............... C02F 3/12 |
|---|---|---|---|
| WO | WO2008122083 | 10/2008 | |

OTHER PUBLICATIONS

DeCarolis et al.—Performance Investigation of Membrane Bioreactor Systems [Dec. 2007; pp. 2536-2550].*
Lift Station Definition [accessed Jun. 2013; 2 pages].*

(Continued)

*Primary Examiner* — Dirk Bass
*Assistant Examiner* — Hayden Brewster
(74) *Attorney, Agent, or Firm* — McHale & Slavin, P.A.

(57) ABSTRACT

The invention is directed to wastewater treatment and wastewater reuse. A distributed biological treatment system for modification of the sewer biofilm through the mechanism of competitive exclusion by strategic dosing with facultative bacteria is illustrated, in conjunction with a novel membrane biological reactor (MBR)/biological breeding reactor (BBR) package plant, a plurality of which are likewise designed for strategic placement throughout the sewer/collection system infrastructure. The inclusion of the MBR/BBR plants at specific locations within the distribution system provide upstream water reclamation, thereby facilitating more efficient operation of the downstream wastewater treatment plant and providing for water reuse at intermediate points within the distribution network, as well as a means for concentrating the facultative bacteria which has been dosed to various points in the system, which can then be re-inoculated to the system.

14 Claims, 6 Drawing Sheets

(56) References Cited

U.S. PATENT DOCUMENTS

| | | |
|---|---|---|
| 5,454,938 A | 10/1995 | Doyle et al. |
| 5,578,211 A | 11/1996 | Dickerson |
| 5,788,841 A | 8/1998 | Dickerson |
| 5,976,365 A | 11/1999 | Petit |
| 7,329,344 B2 | 2/2008 | Jordan et al. |
| 7,387,723 B2 | 6/2008 | Jordan |
| 7,413,654 B2 | 8/2008 | Applegate et al. |
| 7,455,765 B2 | 11/2008 | Elefritz et al. |
| 7,510,655 B2 | 3/2009 | Barnes |
| 7,569,148 B2 | 8/2009 | Elefritz, Jr. et al. |
| 2006/0037909 A1* | 2/2006 | Langlais et al. ............. 210/609 |
| 2006/0113244 A1* | 6/2006 | Johnson et al. ............. 210/607 |
| 2007/0163958 A1* | 7/2007 | Newcombe et al. ......... 210/650 |
| 2008/0251451 A1* | 10/2008 | Christian et al. ............. 210/614 |
| 2009/0236235 A1 | 9/2009 | Wilkins et al. |
| 2009/0261027 A1 | 10/2009 | Elefritz, Jr. et al. |

OTHER PUBLICATIONS

Gubuza—The use of striped gas liquor (SGL) as process cooling water: Analysis of the effects of operational conditions on microbial community dynamics, fouling, scaling and corrosion [Dec. 2007; 126 pages; see p. 8].*

\* cited by examiner

DISTRIBUTED FACULTATIVE BACTERIA WATER TREATMENT SYSTEM WITH MEMBRANE BIOLOGICAL REACTOR PACKAGE PLANT AUGMENTATION

REFERENCE TO RELATED APPLICATION

This application claims the benefit of the filing date of U.S. Provisional Patent Application No. 61/389,550, filed on Oct. 4, 2010, the contents of which are incorporated herein by reference in its entirety.

FIELD OF THE INVENTION

This invention relates to wastewater treatment and wastewater reuse; more particularly to a distributed biological treatment system for modification of the sewer biofilm through the mechanism of competitive exclusion by strategic dosing with microbial populations utilizing a dewatering membrane biological reactor unit modified to form a biological breeding reactor.

BACKGROUND OF THE INVENTION

Sewer water has been introduced to the wastewater treatment plant (WWTP) as a diluted material for treatment. In many cases the WWTP receives its influent containing very low loading 150 ppm cBOD from residential contributors and varying loads from the combination of residential with industrial blends. In rare instances the influent load is extremely high based on a majority of the load coming from heavy industrial/commercial contributors. However, in most cases the influent to the WWTP is 90% or greater diluted by fresh drinking water. This variation of influent loads makes it difficult to treat and the WWTP must be able to adjust based on the variations of the influent load constituents. The solution to varying loads is to dewater the influent efficiently during the conveyance phase. The collection system typically contains lift stations or central collection hubs that are designed to either lift the waste water to a higher elevation or to collect the smaller pipe branches into a larger diameter pipe to accommodate the increased flows. Both systems using sanitary or combined sewer systems could benefit equally in reducing hydraulic loads to the WWTP. Combined sewer systems could adjust operations to minimize rain events. Sanitary sewers with high inflow and infiltration (I/I) from rain events could minimize hydraulic flow by processing higher reuse flow rates based on diluted concentration of waste constituents.

Prior U.S. Pat. Nos. 5,578,211 and 5,788,841 to Dickerson taught a methodology for modifying the sewer biofilm through the mechanism of competitive exclusion and thereby achieving both reduction/control of biologically caused odor causing gases and improvement of treatment plant operations. The methodology taught in the '211 and '841 patents has been shown to have a positive impact on plant influent loadings and plant performance. However, the gross volumetric flow into the wastewater treatment plant remains problematic. In addition, maintaining bacteria concentrations is a significant cost associated with systems employing the '211 and '841 patents.

Thus, what is lacking in the art is a system positioned for upstream dewatering as well as onsite breeding of microbial species which complemented the efficiencies realized by the biological treatment of the '211 and '841 patents.

SUMMARY OF THE INVENTION

The present invention is directed toward a methodology which combines strategically positioned dewatering processes in conjunction with a bioaugmentation technique which includes the successful application of microbial treatment, such as but not limited to facultative bacterial treatment. This two part system results in a strategically distributed wastewater treatment system for reclamation of wastewater near the source for both non-potable and potable uses as well as producing highly concentrated populations of predetermined microbial populations. In essence, "mining the sewer" for valuable water resources and bulking of bacteria to be reintroduced to the collection system.

The invention further relates to a novel membrane biological reactor (MBR)/biological breeding reactor (BBR) package plant, pluralities of which are likewise designed for strategic placement throughout the sewer/collection system infrastructure. Inclusion of the MBR/BBR plants at specific locations within the distribution system provides two important functions. First, they provide a mechanism for upstream water reclamation, thereby facilitating more efficient operation of the downstream wastewater treatment plant and provide for water reuse at intermediate points within the distribution network. Second, they provide a mechanism for concentrating the microbes, such as facultative bacteria, through use of the MBR being adapted to function as Biological Breeding Reactor (BBR). By utilizing the MBR as a BBR, the bacteria can be bulked at on site locations within the collection system, thereby reducing the necessary volumes of bacteria to the city and reducing costs.

In addition to the novel MBR/BBR unit, the instant invention discloses a process for distribution of the MBR/BBR plants at specific locations within the water treatment in a coordinated manner whereby upstream water reclamation is provided. Water reclamation facilitates more efficient operation of the downstream wastewater treatment plant and provides for water reuse at intermediate points within the distribution network. The process in accordance with the instant invention also describes dewatering while simultaneously collecting a concentrated sludge which is a source of facultative bacteria, equivalent to that which has previously been dosed to various points in the system, and then re-inoculating the system with the facultative bacteria enriched sludge collected in the MBR/BBR unit. A second aspect of the process includes maximizing bacteria bulking during predetermined times to provide onsite concentrations of one or more species/subspecies of bacteria which can be released to the collection system.

The advantages of the two part process include reduction in energy costs by removing water that is only a means of dilution and conveyance. By reducing the volume of water the waste increases in solids and bio-available materials that can be further digested. The waste water entering the WWTP is more concentrated and digestion can be increased by way of increasing Volatile Fatty Acids (VFA) which aids in digestion being beneficial to the process steps both in the conveyance and within the WWTP. Loads are more consistent reducing wide swings in the process that result in additional chemical consumptions. Additionally, the plant, receiving more bio-available solids in higher concentrations, can reduce the Returned Activated Sludge (RAS) volumes further reducing energy at the plant. In effect the initial grit chambers and/or oxidation chambers can become final roughing plant steps prior to further treatment steps. In effect, the plant is rebalanced, reducing significant power consumption and improving performance. Reduction of the conveyance of the hydraulic load is also reduced. The United States consumes 3-5% of the total energy produced on moving water and waste water. By Bio-Augmentation the energy can be reduced by 40-60% alone. In combination with sewer mining it is estimated that energy consumption for waste water can be reduced by up to 90%. Finally, by establishing a bacterial breeder, overall costs of repeated delivery of bacterial agents as part of a city's bioaugmentation program is reduced because the system itself becomes the dosing/delivery mechanism.

The initial approach to reducing energy and improving infrastructure was to move to Bio-Augmentation within the collection system to reduce loading by pre-treating the waste water during the conveyance phase. This pre-treatment has proven to provide digestion of solids and improving the cBOD for plant influent. Bio-Augmentation has continued to evolve and biology is the fundamental mechanism of the WWTP. The improvement derived via the instantly proposed two pronged approach effectuate a unique distributive wastewater treatment system.

Accordingly, it is a primary objective to teach a system, device and process that provides upstream water reclamation and produces highly concentrated microbial solutions through biological breeding.

It is a further objective of the instant invention to teach a system, device and process to dewater a waste stream allowing for water reuse, in various forms, thereby reducing the hydraulic load to the receiving WWTP.

It is yet an additional objective of the instant invention to teach a system, device and process which provides a Biological Breeding Reactor (BBR) allowing for bacteria to be bulked at on site locations within the collection system, thereby reducing the necessary volumes of bacteria required by the municipalities to use in its wastewater treatment.

It is a further objective of the instant invention to teach a distributed biological treatment system for modification of the sewer biofilm through the mechanism of competitive exclusion by strategic dosing with microbial populations.

It is a further objective of the instant invention to teach a distributed biological treatment system for modification of the sewer biofilm through the mechanism of competitive exclusion by strategic dosing with facultative bacteria.

It is yet an additional objective of the instant invention to teach a novel membrane biological reactor (MBR)/Biological Breeding Reactor (BBR) package plant, a plurality of which may be provided for strategic placement throughout the sewer/collection system infrastructure.

It is a still further objective of the instant invention to teach a process for distribution of the MBR/BBR plants at specific locations within the water treatment in a coordinated manner whereby upstream water reclamation and biological breeding of microbes is provided.

Still another objective of the instant invention is to teach a system, device and process which results in reduction of the energy by removing the water from wastewater that is only a means of dilution and conveyance to the WWTP.

It is a further objective of the instant invention to teach a system, device and process which treats wastewater while such wastewater is in transit to the a main wastewater treatment plant.

It is a further objective of the instant invention to teach a system, device and method which treats the water using equipment that can be adjusted based on the typical wastewater to address organic load or solids.

It is yet another objective of the instant invention to teach a system, device and process which maximizes dewatering during the high use periods of a diurnal cycle, thereby providing more uniform flow to the plant on a 24 hour basis.

It is yet another objective of the instant invention to teach a system, device and process which maximizes bacteria bulking during the low use period of a diurnal cycle, thereby providing on site concentrations of one or more species/subspecies of bacteria which can be released to the collection system during high use periods.

It is yet another objective of the instant invention to teach a system, device and process in which dewatering and/or other water treatment processes can be relaxed during a predetermined time period to allow for in situ cleaning of membrane devices.

It is yet another objective of the instant invention to teach a system, device and process which can be used to reduce Fats, Oil, and Grease (FOG) in both the collection system and on membrane surfaces.

It is a further objective of the instant invention to teach a system, device and process which can be utilized in municipal environments.

It is a further objective of the instant invention to teach a system, device and process which can be used in industrial environments.

It is a further objective of the instant invention to teach a system, device and process which can be utilized in mixed municipal and industrial environments.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

The following description will illustrate the combination of a microbial, preferably facultative bacteria, bioaugmentation system with a membrane biological reactor installation to result in a synergistic treatment of a distribution system inclusive of strategic dewatering to result in efficient sewer mining while producing an efficiently treated and concentrated influent stream to the wastewater treatment plant (WWTP). In addition to providing a dewatering mechanism at strategic points, the membrane biological reactor unit is adapted to function as a biological breeding reactor (BBR), thus providing a mechanism to utilize the unit as a bacterial breeding unit to provide highly concentrated bacterial populations. Accordingly, the instant invention describes a method of treating wastewater upstream of a wastewater treatment plant which reduces the hydraulic load of the wastewater treatment plant in combination with providing highly concentrated microbial population.

Figure 1:
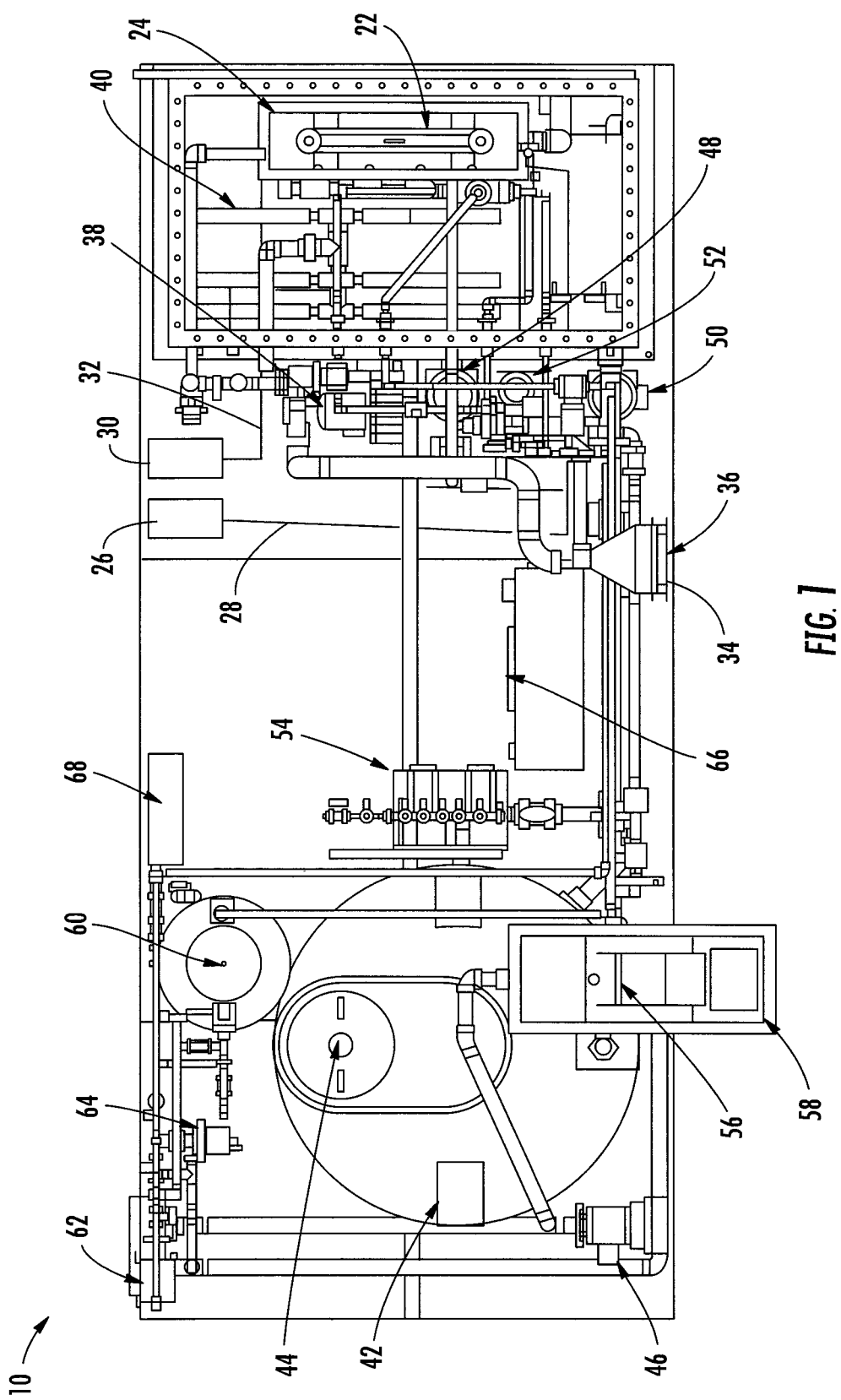
FIG. 1 is a top view of an illustrative embodiment of a MBR/BBR unit adapted to provide dewatering as well as function as a biological breeding reactor in accordance with the instant invention.
Figure 2:
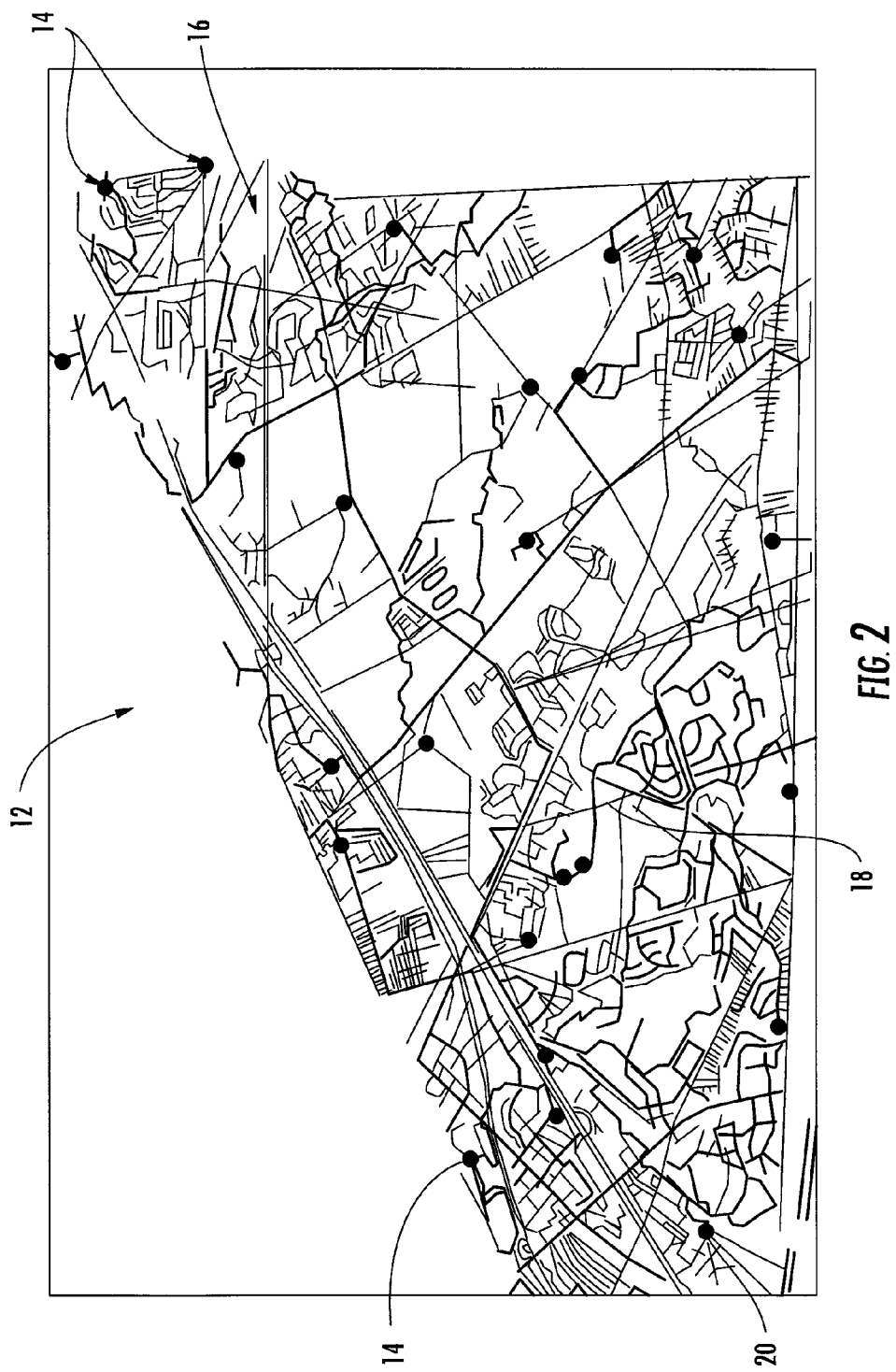
FIG. 2 is representative installation map for a typical city showing the strategically located injection points, such as lift stations, of the MBR/BBR unit identified to indicate suitable location for sewer mining and microbial concentrating.

Referring to FIG. 1, an illustrative example of a water treatment unit adapted to dewater and to function as a biological breeding reactor is shown and referred to generally as 10. The unit 10 is designed to provide full capability to treat wastewater upstream of the WWTP. Accordingly, such units can be strategically placed in one or more locations which are upstream of a municipality main WWTP. FIG. 2 illustrates a map of a typical city 12. Ideally, city sewer systems are designed so that wastewater flows downstream to the main WWTP through the use of gravity. However, such mechanisms are not always possible and municipal water systems often employ the use of lift stations to pump wastewater from areas of low elevation to areas of high elevation so gravitational forces can be employed. Such lift station can be an ideal placement for the MBR/BBR unit 10. While a preferred embodiment may include placement at such lift stations, the MBR/BBR unit 10 is not limited to placement at these locations and can be placed at other strategic locations in which wastewater is transported or stored, such as one or more flow channels of a wastewater treatment plant. As illustrated in FIG. 2, multiple MBR/BBR units, shown as filled in circles 14, in accordance with the instant invention are distributed to strategic locations throughout the city wastewater landscape. For example, several units 10 are shown positioned in a developed area (i.e. an area having houses and/or businesses) shown at the north-eastern section of the city 12. Additional units 10 may be placed in a developed area located in the central part of the city 18, or at the southwest section 20 of the city 12. Various criteria can be used to determine placement of such units, including distance to the WWTP, type of waste generated, population density, or other factors known to one of skill in the art. Since unit 10 is designed to function as a BBR, strategic placement may take into account the distance between the units in order to maximize the effect of using the units 10 as a breeding reactor.

Preferably, the water treatment unit is coupled to a lift station. By coupling the water treatment unit 10 to already existing lift stations, the unit 10 can be easily and quickly added to existing structures within the system. Preferably, wastewater from the clear well (not illustrated) of the lift station is pumped into the water treatment unit 10. As the wastewater is moved through the unit 10, it gets dewatered. The dewatering process reduces the hydraulic load to the WWTP. In addition, the unit further provides for seeding the water which gets returned to the clear well of the lift station with high concentrations of bacteria. The bacteria are used downstream to begin to treat the wastewater prior to entering the WWTP.

Referring back to FIG. 1, the illustrative embodiment of the water treatment unit 10 is preferably designed to provide dewatering and biological breeding. The unit 10 includes at least one membrane 22 housed in a membrane chamber 24. Any membrane known to those of skill in the art can be used, such as but not limited to vacuum driven MBR membranes. The at least one membrane 22 should have the characteristics of being capable of separating solids and liquids and preferably provide for the separated water to be clean enough under regulatory statutes to be usable as potable water. The unit 10 preferably contains a biological element delivery device 26 which is in fluid communication with the membrane chamber 24 through piping 28. The biological delivery device 26 provides a delivery system for delivering one or more biological elements, such as one or species/subspecies of bacteria to the membrane chamber 24. A nutrient source 30, which is in fluid communication with the membrane chamber 24 through pipe 32, provides growth and support for the biological elements delivered by the biological element delivery device 26. Oxygen is provided to the at least one membrane 22 through several features, including an air intake inlet 34 having an air intake filter 36, one or more blowers 38, and fine air diffuser 40.

In addition, the unit 10 may include other hardware to provide water treatment capability in addition to the dewatering/bio-breeding. For example, the device may employ an anoxic tank 40 and anoxic tank agitator if de-nitrification is desired, or may contain hardware to provide aerobic conditions and processes prior to entry of the wastewater into the membrane chamber 24. Several pumps, such as a feed pump 46, an aerobic to membrane pump 48, an aerobic to anoxic sludge wasting pump 50, and a permeate pump are utilized throughout the system to move the fluids through various parts of the of the unit 10 and at various points in the treatment process. To allow the unit to run smoothly, a chemical feed pump 54 is used to provide chemicals, such as acids, to the membrane chamber 24 for cleaning and/or pH. Mechanisms for preventing the clogging of wastewater flow throughout the unit 10 resulting from foreign objects or large debris being inserted within the system such as, but are not limited to, a bar screen 56 and solids drop chute 58. The final dewatered fluid can be placed within a storage tank 60 prior to being passed through an ultraviolet sterilization unit 62. The flow of permeate can be controlled through use of permeate control valves 64. A control system 66 is contained in an single enclosure and contains a combination of hardware (such as display panels or monitors, motor starters, electrical hardware) and software components, such as a programmable logic control unit or direct manipulation interface units such as graphical user interfaces and/or touch screen interfaces, which provide visualization (visualize operating information graphically, digitally, lights and buttons), monitoring (capable of accessing data such as pump operating trends, alarm history, pump failures, system parameters such as alarm set points, timers), programming (customization of pump operations), and/or control capabilities. The unit 10 may further contain an electrical distribution panel 68 located in a separate enclosure or as part of the control system enclosure.

Figure 3:
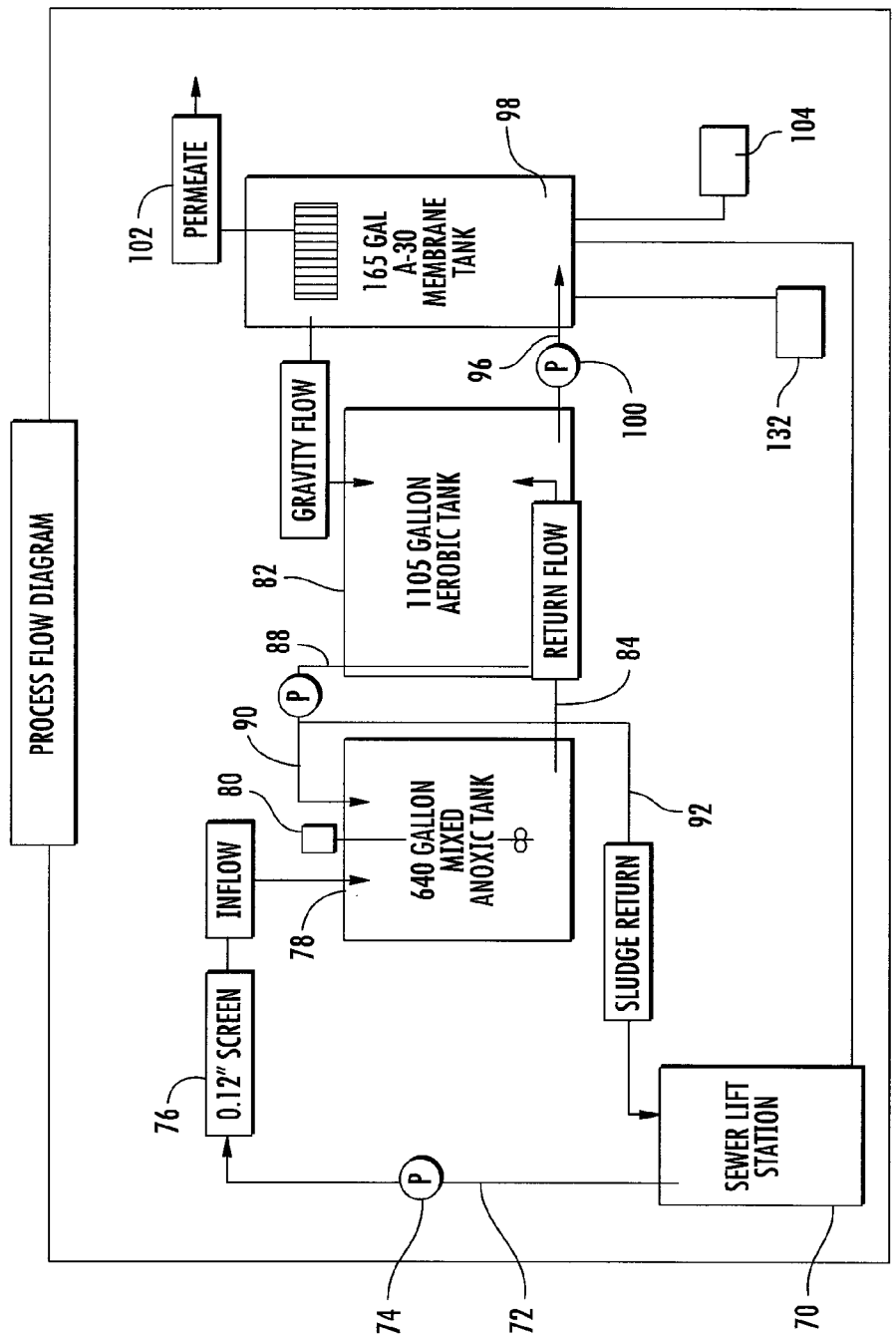
FIG. 3 is a flow diagram illustrating the operation of the sewer mining package plant MBR/BBR facility.

FIG. 3 illustrates a schematic generalized flow diagram utilized by the MBR/BBR unit 10. Portions of the wastewater from the sewer lift station 70 are moved through fluid flow lines, i.e. pipe 72, by injector or sum pump 74 located between high and low level controls of the lift station pumps above any potential sludge layers within the lift station, past a debris removal device, such as a 0.12 inch screen 76. The wastewater is then placed in an anoxic tank 78 containing a mixing device 80. After treatment in the anoxic tank 78, the fluid is transported to an aerobic tank 82 through flow line 84. Any sludge generated from the aerobic process can be moved through line 88 by pump 90 either to the anoxic tank 78 through flow line 90 or back to the lift station 70 through flow line 92 for further processing or removal by other means. Once the wastewater has undergone aerobic treatment, the fluid is transported via flow line 96 to the membrane reactor tank 98 by pump 100. While in the membrane reactor tank 98, the fluid can be dewatered as well as seeded for bacteria treatment further down stream and/or released as permeate 100. Alternatively, the wastewater from the sewer lift station 70 can be directed into the membrane tank 98 for dewatering without undergoing aerobic processes or de-nitrification.

The process for dewatering is typically allowed to run for predetermined times and/or lengths of time. Preferably, the dewatering system is run during high use times when high levels of wastewater are generated. At times of low wastewater generation, the dewatering system is shut down to allow for biobreeding activities. Preferably, such biobreeding activities include developing high concentrations of one or more species/subspecies of bacteria within the membrane tank 98. As the dewatering process system is shut down and the membrane is relaxed, predetermined levels of bacteria having one or more strains are dispensed into the membrane reactor tank 98 through the use of a dispensing device such as a dosing station 104.

Figure 4:
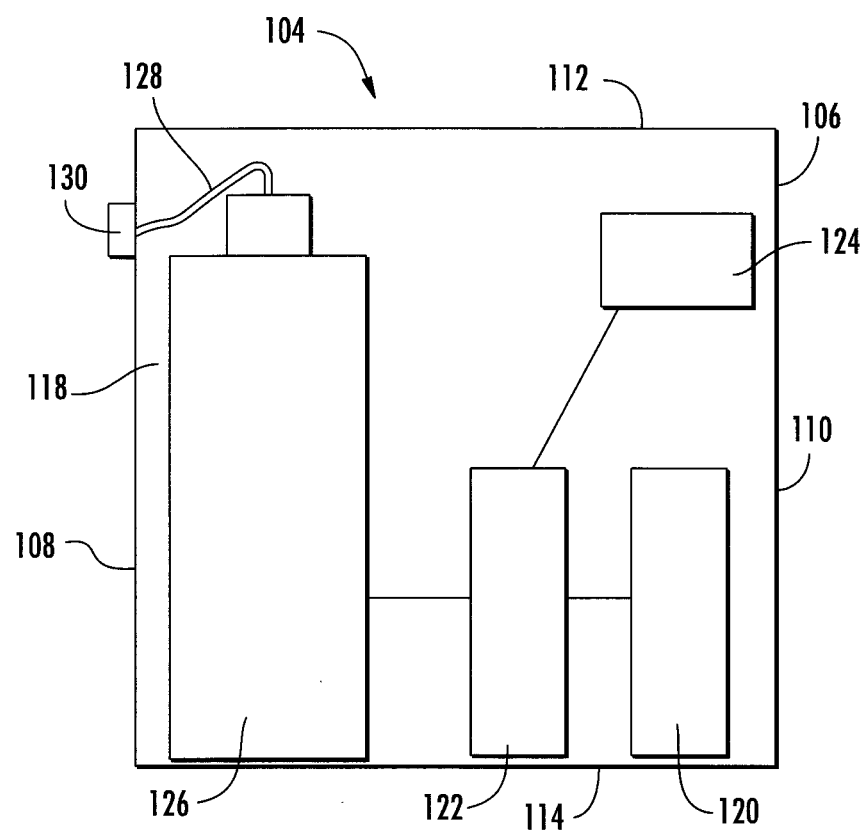
FIG. 4 is a block diagram of an illustrative embodiment of a dosing unit used to deliver a microbial consortium to the membrane tank.

FIG. 4 is an illustrative embodiment of the dosing station 104 shown in FIG. 3. The dosing station 104 is designed to hold a bacteria consortium and comprises of a back panel 106 containing side walls 108 and 110 arranged in parallel fashion, and walls 112 and 114 arranged in parallel fashion. The dosing station 104 also contains a front panel 116, not illustrated in order to show the internal components of the dosing station 104. Back panel 106, walls 108, 110, 112, and 114, and the front panel 116 interconnects to form an enclosed interior portion 118. The interior portion 118 contains the working elements of the dosing station 104. The dosing station 104 is powered by a power source, illustrated herein as a battery pack 120. A pump 122, illustrated herein as a solenoid pulse pump, is operated by a small circuit board 124. A nozzle (not illustrated) may be used to help dispense the microbial consortium in a directed manner. The dosing station 104 holds a source of microbes which is stored in a reservoir 126 and dispensed through tubing 128 to the outside through opening 130. In order to populate the membrane tank 98, the dosing station 104 can be configured to continually deliver a pre-determined amount of the microbial consortium over a period time. Delivery of the microbial consortium may be overridden by the main control system for increased delivery during bulking periods based on loading. The dosing station may also fluidly connect to the aerobic tank 82 so that depending operation and loading, the microbial consortium could be delivered to the aerobic tank 82.

Referring back to FIG. 3, a nutrient source 132 is in fluid communication with the membrane tank 98. The nutrient source is used to allow the bacteria placed within the membrane tank from the dosing station 104 to rapidly divide, thereby providing a high concentration of the bacteria. Accordingly, the composition of the nutrient source will vary depending on the make-up of the bacteria used. The nutrient source will be optimized to provide rapid growth for a given time period. The timing of the shut down of the dewatering process and the beginning of the biobreeding process is preferably at a time when generation of wastewater is low. At a predetermined time, the fluid in the membrane tank 98 containing highly concentrated levels of predetermined types of bacteria is dumped back to the sewer lift station through fluid line 134. In doing so, a high concentration of bacteria will be distributed throughout the wastewater treatment system as the wastewater from the lift station travels downstream to the WWTP.

Figure 5A:
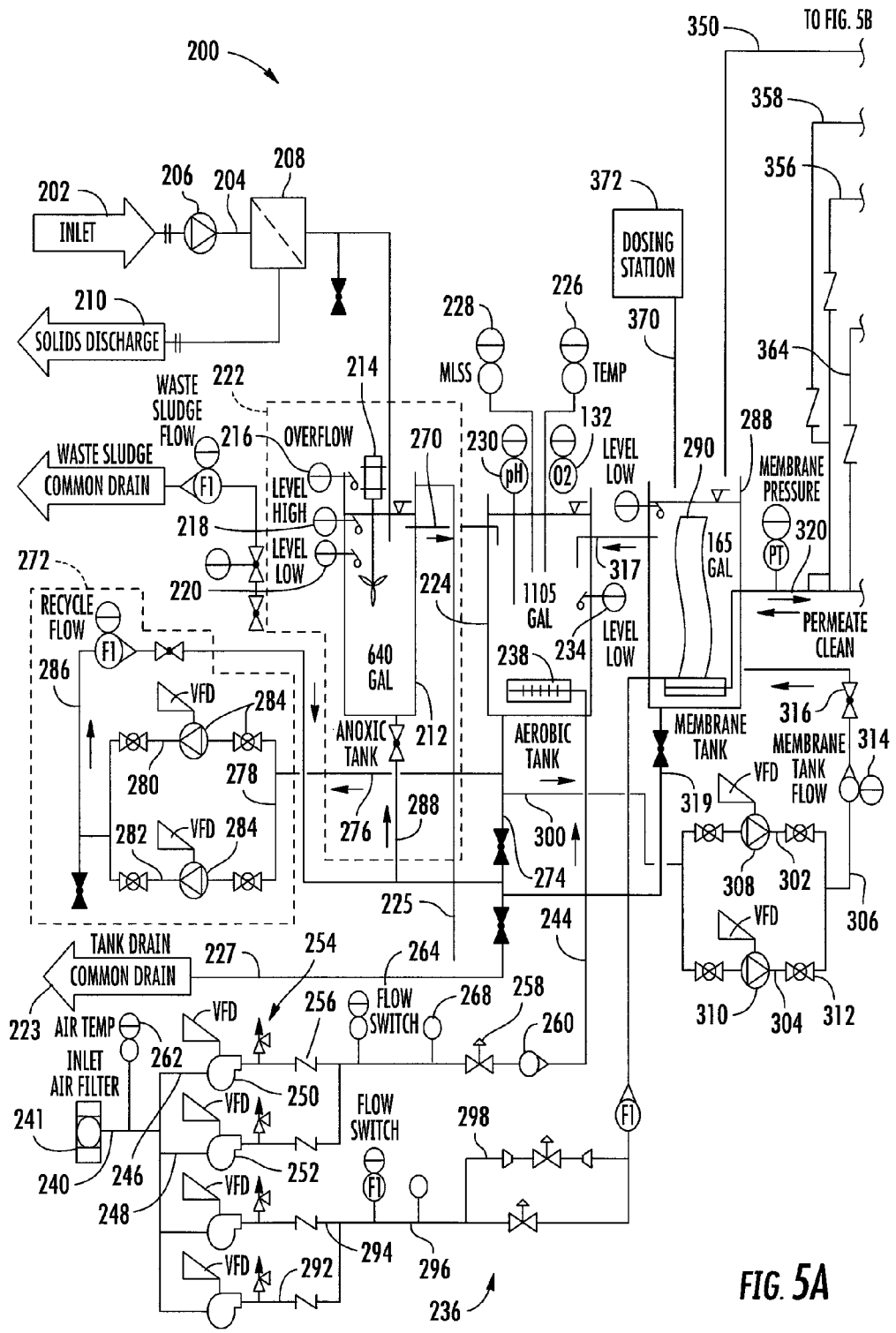
FIGS. 5A-5B illustrate a process flow diagram and design parameters for the sewer mining MBR/BBR unit in accordance with the instant invention.
Figure 5B:
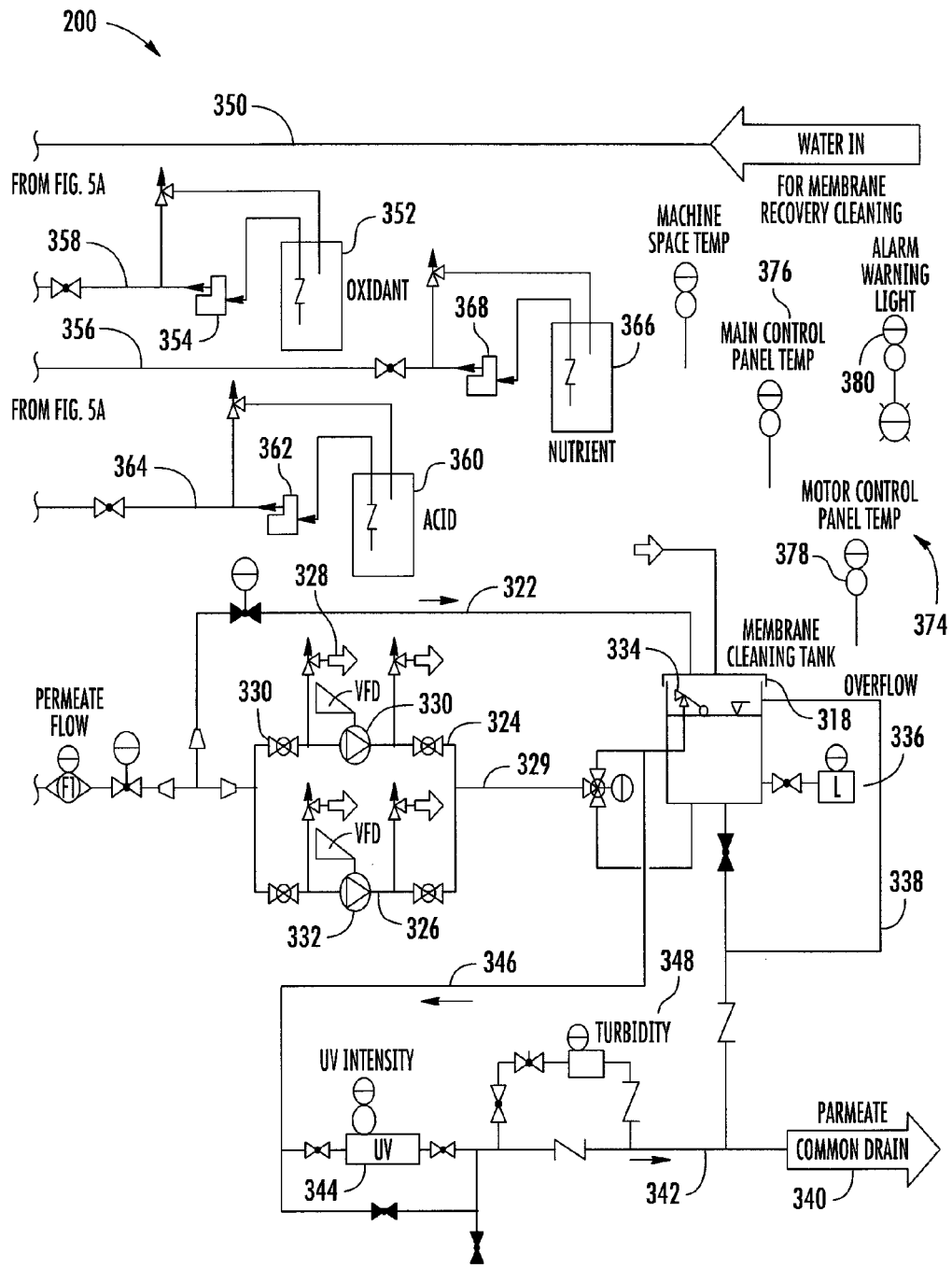

Referring to FIGS. 5A-5B, an illustrative embodiment of the method, generally referred to as 200, utilizing the device and system of the membrane bioreactor and biobreeding reactor unit 10 is shown. An illustrative example of a method of treating wastewater upstream of a wastewater treatment plant which reduces the hydraulic load of the wastewater treatment plant in combination with providing highly concentrated microbial population includes the steps of: 1) identifying at least one wastewater flow channel feeding a wastewater treatment plant, the wastewater flow channel feeding a wastewater treatment plant may be for example a wastewater lift station and the wastewater treatment plant may be capable of processing municipal waste, industrial waste, or combinations thereof; 2) placing or providing a membrane bioreactor and biological breeding reactor unit which is adapted to dewater wastewater at or near the wastewater flow channel feeding a wastewater treatment plant; 3) fluidly coupling the membrane bioreactor and biological breeding reactor unit to the wastewater flow channel feeding a wastewater treatment plant; 4) turning on a dewatering process by directing or diverting wastewater from the wastewater flow channel to a membrane reactor tank within the membrane bioreactor and biological breeding reactor unit; 5) forming a dewatered wastewater by separating liquid portions of the diverted wastewater from solid portions of the wastewater in the membrane tank (including but not limited to a permeate having characteristics of water that conforms to local and national usable water standards) of the wastewater from the solid portions by contacting the wastewater with a membrane within the membrane tank, the contact resulting in the wastewater being separated into in a liquid potion and a solid portion, the liquid portion being directed to a separate holding tank and used for other purposes such as providing water reuse at intermediate points within the WWTP system, the solid portion being discarded or directed to the one or more sources of wastewater located upstream of a wastewater treatment plant; 6) turning off the dewatering or liquid separating step after a predetermined time or number of dewatering cycles; 7) providing the membrane reactor tank with a predetermined microbial consortium to aid in wastewater treatment, the microbial consortium preferably one or more species/subspecies of bacteria, and more preferably facultative bacteria; 8) allowing the microbial consortium to reproduce for a predetermined amount of time, forming a highly concentrated microbial solution; 9) introducing or directing the highly concentrated microbial solution to at least one wastewater flow channel feeding a wastewater treatment plant; and 10) performing optional additional processes, include de-nitrification process, aerobic treatment process, membrane cleaning processes, ultraviolet purification process, or combinations thereof, whereby the dewatered wastewater which is diverted to other uses reduces the hydraulic load on the downstream wastewater plant and the highly concentrated microbial solution introduced into said flow channel functioning to modify the sewer biofilm.

The process 200 utilizes the MBR/BBR unit 10 which are coupled to wastewater flow channel feeding a wastewater treatment plant, such as a standard lift station. However, the unit 10 may be coupled to any source of wastewater flow channel feeding a wastewater treatment plant or other wastewater source that is placed upstream of the main wastewater plant. Arrow 202 indicates a predetermined amount of wastewater removed from the lift station, such as from a clear well, and pumped in to fluid flow lines, such as pipe 204, through a pump 206. Use of a filtering system, such as a screen 208, can be used to remove large debris in order to prevent blockage of the fluid flow lines throughout the device. The solids removed as a result of the use of the screen 208 can be removed from the system and disposed of or placed back into the lift station for further processing or for removal as part of the lift station filtering system, see arrow 210. Should de-nitrification be desired, pipe 204 directs the wastewater into a tank 212 which provides for anoxic conditions and de-nitrification process in accordance with well known procedures. The anoxic tank 212 contains an agitating or mixing device 214 as well as sensors and indicators for monitoring one or more important parameters involved with the de-nitrification system, including, but not limited to, an overflow sensor 216, high water level sensor 218, low water level sensor 220, or combinations thereof. The de-nitrification process within the broken-lined box 222 is an optional part of the process. If de-nitrification is utilized, once the process is complete, the wastewater can be moved through the unit 10 for further processing. The wastewater stored in the anoxic tank 214 may also be transferred to the clear well of the lift station, see arrow 223 through pipes 225 and 227.

Should the de-nitrification process not be utilized, wastewater siphoned from the clear well tank of the lift station can be directed directly into tank 224 for aerobic processing (in accordance with wastewater aerobic treatment processes known in the art) through methods known to one of skill in the art. The aerobic tank 224 contains one or more sensors and indicators for monitoring one or more important parameters involved with the aerobic wastewater processing system, including, but not limited to temperature 226, MLSS 228, pH 230, air levels 232, low water levels 234, or combinations thereof. To provide aerobic processing, the dewatering/biobreeding unit 10 includes oxygen providing system, generally referred to as 236. The air providing system 236 includes an air diffuser 238 which is in fluid communication with an inlet air filter 240 through use of air fluid lines 242 and 244. Air is drawn into the system through the inlet air filter 240 and moved to two parallel fluid lines 246 and 248. Air is moved through fluid lines 246 and 248 to fluid line 244 through the use of bi-directional pumps or air blowers 250 and 252. The system 236 contains a plurality of valves, including, but not limited to a safety PSV valve 254, check valves 256, pneumatic valves 258, and fluid rotometer 260. One or more monitoring devices, such an air temperature gauge 262, flow switch gauges 264, and pressure gauges 268 are used throughout the system to monitor important parameters of the system. If the de-nitrification process is used in combination with aerobic treatments, the treated wastewater can be transferred from the anoxic tank 212 to the anaerobic tank 224 through pipe 270.

Wastewater that has been processed within the aerobic tank 224 can be transported through several different fluid flow lines. For example, wastewater can be directed back to the lift station through 274 and 227. Alternatively, the wastewater can be transported from the aerobic tank 224 to the anoxic tank 212, and back to the aerobic tank 224 through an optional piping system, generally referred to by the broken lined box 272. Wastewater exits the aerobic tank 224 through pipe 274 and is directed to pipe 276 and 278, where it is split into two parallel pipes 282. Both pipes 280 and 282 contain bidirectional valves and a plurality of ball valves 284. Water from the two pipes 280 and 282 converge into pipe 286 which moves the water to the anoxic tank through pipe 288. Alternatively, water from the pipe 286 may be directed to the pipe 274 and out to the lift station through pipe 227. Wastewater leaving the aerobic tank 224 also can be directed a third tank, a membrane tank 288.

The membrane tank 288 contains at least one membrane 290 which is adapted to separate liquids and solids, providing a mechanism to remove clean water from the wastewater process. Accordingly, the wastewater passing through the membrane 290 should result in a water source which is within national standards or local standards for permeate. The membrane tank 288 is preferably provided with air coming from the air delivery system 236. The system 236 contains two flow lines 292 and 294 which have the same features as that described in flow lines 246 and 248. The flow lines 292 and 294 converge into flow line 296. A flow line 298 diverges from the flow line 296 and eventually converges back into flow 296. The flow line 296 provides the air source to the membrane tank 288.

Wastewater from the aerobic tank 224 is directed from pipe 274 to the membrane tank 288 for dewatering though pipe 300. Water travels through pipe 300 to two parallel pipes 302 and 304 prior to being directed to the membrane tank 288 through pipe 306. Pipes 302 and 304 each contain bidirectional pumps 308 and 310 as well as one or more ball valves. Water flow through pipe 306 can be controlled through the use of a membrane tank flow meter 314 and a gate valve 316. Wastewater stored within the membrane tank 288 may be directed back to the aerobic tank 224 through pipe 317 or may be directed back to the filter station through pipes 319, 274, and 227. While the process 200 has been describes so far as including de-nitrification as well as aerobic processes prior to dewatering, wastewater from the lift station can be directly placed into the membrane tank 288 for dewatering without undergoing the other processes. In either case, it is preferable that such dewatering is performed during periods in which generation of wastewater is at its maximum. For example, during diurnal cycles, typically wastewater generation is high from a period of between 6 AM and 9 PM. During this time, the process is allowed to run so that the membrane tank 288 dewaters the wastewater, thereby reducing hydraulic load to WWTP.

Permeate generated from the membrane tank 288 is directed to permeate water holding tank 318 through pipe 320 and a series of diverging and converging pipes 322, 324, 326 and 328. Pipe 322 dispenses permeate directly into the permeate water holding tank 318. Pipes 324 and 326 each contain bidirectional pumps 330 and 332 which are designed to reverse fluid flow automatically based on differential pressure from the membrane as the membrane becomes dirty. Pipes 324 and 326 may additionally contain one or more safety PSV valves 328 and ball valves 330. Water flow from pipes 324 and 326 is directed through pipe 329 into permeate water holding tank 318. The permeate water holding tank 318 may contain a fill valve 334 to control the flow of water into the tank. An overflow system 334 is used if too much water is placed into the tank. Overflow water is directed to pipe 338 which drain to a common drain, see arrow 340, through pipe 342. Permeate water may also be treated by ultraviolet purification. Under such a process, permeate from the permeate water holding tank 318 is transferred to UV filtration purifier 344 through pipe 346 and tested for turbidity 348 prior to being dumped into a common drain for reuse or a storm drain or outfall, see arrow 340. Pipe 350 is designed to provide the membrane tank with 288 a source of clean, potable water, such as from the permeate water holding tank 318, if needed.

At pre-determined time periods, the membrane 290 can be cleaned. Oxidants, such as but not limited to chlorine and hydrogen peroxide, stored in an oxidant tank 352 is feed via a feeder device 354 into pipe 356 through pipe 358. Acids stored in an acid tank 360 are feed via an acid feeder device 362 into pipe 364. Pipe 356 and 364 direct their contents to the membrane tank 288 through pipe 320. Placement of the oxidant and the acid into the membrane tank 288 may be a single step or two step processes. Membrane cleaning is preferably performed when the wastewater system produces low levels of waste and the dewatering cycles have been stopped. As described previously, in a diurnal cycle, membrane cleaning may be performed sometime between 9 PM and 6 AM. Additionally, the unit 10 also contains a nutrient holding tank 366. The nutrient holding tank is fluidly connected to the membrane tank 288 through pipes 356 and 320. Nutrients are directed into the pipe 356 using a feeder device 368. Fluidly connected to the membrane tank 288 through pipe 370 is a dosing station 372. The dosing station, such as that described in FIG. 4, dispenses a microbial consortium containing one or more predetermined bacteria species and/or subspecies which aid in breakdown of wastewater. The type of bacteria depends on the type of wastewater generated at within the sewer system. The nutrient is composed of ingredients that provide optimal growth and/or reproduction for the specific bacteria used. The dosing station and the nutrient sources are designed to work in combination to create a biobreeding unit. Preferably, when the wastewater generation is low for a given system, the system 200 is tuned off (i.e. no dewatering) and the membrane is allowed to relax. The dosing station 372 is allowed to deliver bacteria into the membrane tank 288. Nutrients are also delivered to the membrane tank 288. The system remains off with the exception of air for mixing if required for a predetermined time to allow the bacteria to grow and provide a highly concentrated mixture. Prior to the system 200 being tuned back on (i.e. dewatering cycles begin), or concurrently with the system running, the membrane tank 288 dumps the highly concentrated bacteria solution back into flow channels, i.e. the lift station. This highly concentrated bacteria solution is then dispersed into the main wastewater system (lift station clear well) upstream of the WWTP and functions to provide an onsite continuous supply of bacteria which modify the sewer biofilm through the mechanism of competitive exclusion, thereby achieving both reduction/control of biologically caused odor causing gases and improvement of treatment plant operations as described in the U.S. Pat. Nos. 5,578,211 and 5,788,841.

The system 200 preferably contains a control system referred to generally as 374. The control system contains a combination of hardware and software components which provide visualization, monitoring, programming, and/or control capabilities. As an illustrative example, the control system contains a programmable logic controlled (PLC) unit to control the MBR/BBR unit 10 and the system 200. The control system may include indicators to alert the user with respect to various parameters, such as but not limited to the main control panel temperature 76, the motor control panel temperature 378, or contain an alarm warning device 380. The components of the control system may be enclosed in a single unit positioned on site or may be positioned at a remote location and configured to allow for remote monitoring and controlling. The system 200 and the MBR/BBR unit 10 as described herein are designed to process 250,000 gallons of water per day under normal conditions. However, the system 200 and the MBR/BBR unit 10 unit can be scaled up and the number of membranes can be adjusted to provide for processing larger volumes if needed or can be operated for higher dewatering operation events such as rain events or inflow/infiltration (I/I).

The advantages of system, device, or process as described herein is that energy requirements associated with the wastewater treatments are reduced, the use of facultative bacteria remove odor issues suffered by prior art systems, and returning the biosolids to the sewer while decreasing the flow volume through MBR dewatering and BBR bacteria seeding increases the efficiency of the bioaugmentation system and ultimately of the WWTP. The result of this is a shift in wastewater treatment and reuse. What is provided is a distributed system which is able to treat wastewater within an existing sewer system to preclude the necessity of a massive distribution system that would otherwise be necessary.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of treating wastewater to reduce the hydraulic load of a wastewater treatment plant in combination with providing a highly concentrated microbial population comprising the steps of:

identifying at least one wastewater flow channel feeding a wastewater treatment plant;

fluidly coupling a biological reactor/biological breeding reactor unit to said flow channel said unit adapted to dewater fluids and provide onsite breeding of one or more microbial species, said biological reactor/biological breeding unit having a programmable control unit to control at least a dewatering and a biological breeding process;

turning on a dewatering process during a diurnal cycle between a time period of 6 AM and 9 PM by diverting at least a portion of said wastewater from said flow channel to a membrane reactor tank within said membrane biological reactor/biological breeding reactor unit;

forming dewatered wastewater by separating liquid portions of said diverted wastewater from solid portions of said wastewater in said membrane tank;

turning off said dewatering process;

converting said membrane biological reactor unit to a biological breeding reactor unit by providing said membrane reactor tank with a predetermined microbial consortium;

providing a nutrient solution to said membrane reactor tank, said nutrient solution selected to increase the concentration of said microbial consortium within said membrane reactor tank;

allowing said microbial consortium to reproduce during a diurnal cycle between a time period of 9 PM and 6 AM to form a highly concentrated microbial solution; and directing said highly concentrated microbial solution back into said flow channel whereby said dewatered wastewater is diverted to other uses thereby reducing the hydraulic load on said downstream wastewater plant and said highly concentrated microbial solution introduced into said flow channel function to modify the sewer biofilm;

wherein the steps of turning on said dewatering process and turning off said dewatering process during and after said diurnal cycle between a time period of 6 AM and 9 PM is controlled by said programmable control unit and wherein said process of converting said membrane biological reactor unit to a biological breeding reactor unit and allowing said microbial consortium to reproduce during said diurnal cycle between a time period of 9 PM and 6 AM is controlled by said programmable control unit.

2. The method of treating wastewater to reduce the hydraulic load of a wastewater treatment plant in combination with providing a highly concentrated microbial population according to claim 1 further including the step of strategically positioning said membrane bioreactor/biological breeding reactor unit to two or more flow channels feeding said wastewater treatment plant.

3. The method of treating wastewater to reduce the hydraulic load of a wastewater treatment plant in combination with providing a highly concentrated microbial population according to claim 2 wherein said flow channel is a lift station.

4. The method of treating wastewater to reduce the hydraulic load of a wastewater treatment plant in combination with providing a highly concentrated microbial population according to claim 2 wherein said microbial population is one or more species and/or subspecies of bacteria.

5. The method of treating wastewater to reduce the hydraulic load of a wastewater treatment plant in combination with providing a highly concentrated microbial population according to claim 4 wherein said bacteria includes one or more facultative bacteria species.

6. The method of treating wastewater to reduce the hydraulic load of a wastewater treatment plant in combination with providing a highly concentrated microbial population according to claim 1 further including a de-nitrification treatment process.

7. The method of treating wastewater to reduce the hydraulic load of a wastewater treatment plant in combination with providing a highly concentrated microbial population according to claim 1 further including an aerobic treatment process.

8. The method of treating wastewater to reduce the hydraulic load of a wastewater treatment plant in combination with providing a highly concentrated microbial population according to claim 1 further including membrane cleaning.

9. The method of treating wastewater to reduce the hydraulic load of a wastewater treatment plant in combination with providing a highly concentrated microbial population according to claim 8 wherein said membrane cleaning includes the step of providing an acid, an oxidant, or combinations thereof to said membrane tank.

10. The method of treating wastewater to reduce the hydraulic load of a wastewater treatment plant in combination with providing a highly concentrated microbial population according to claim 1 further includes the step of exposing said dewatered wastewater to ultraviolet filtration.

11. The method of treating wastewater to reduce the hydraulic load of a wastewater treatment plant in combination with providing a highly concentrated microbial population according to claim 1 wherein said wastewater treatment plant processes municipal waste, industrial waste, or combinations thereof.

12. A method of treating wastewater to reduce the hydraulic load of a wastewater treatment plant in combination with providing a highly concentrated bacterial population comprising the steps of:

providing a membrane bioreactor and biological breeding reactor unit which is adapted to dewater wastewater and provide bacteria breeding which results in forming a highly concentrated population of said bacteria, said membrane bioreactor and biological breeding reactor unit comprising at least one membrane tank having a membrane for dewatering wastewater, a bacteria dosing unit fluidly connected to said membrane tank, a source of nutrient fluidly connected to said membrane tank, and a programmable logic controlled unit to control at least said dewatering and bacterial breeding processes during diurnal cycles;

fluidly coupling said membrane bioreactor and biological breeding reactor unit to one or more flow channels of a wastewater treatment plant;

activating a dewatering process by directing at least a portion of said wastewater from said one or more flow channels to said membrane reactor tank;

contacting said wastewater to said membrane to form a dewatered wastewater, said contact resulting in said wastewater being separated into a liquid portion and a solid portion, said liquid portion being used for other means, and said solid portion being discarded or directed to said one or more flow channels of a wastewater treatment plant;

allowing the dewatering process to proceed for a time period of between 6 AM and 9 PM;

stopping said dewatering process after said period has occurred;

dosing said membrane reactor tank with a predetermined bacteria or bacteria consortium by delivering said bacteria or bacteria consortium from said dosing unit;

delivering a nutrient solution to said membrane reactor tank;

aerating said membrane reactor tank to support growth of said bacteria or bacterial consortium;

allowing said bacterial or bacteria consortium to reproduce to form a concentrated bacterial solution from a time period of between 9 PM and 6 AM; and directing said concentrated bacterial solution out of said membrane bioreactor and biological breeding reactor unit back to said one or more sources of flow channels of a wastewater treatment plant;

wherein control of said dewatering process during and after said diurnal cycle between a time period of 6 AM and 9 PM is performed by said programmable logic controlled unit and wherein said process of converting said membrane biological reactor unit to a biological breeding reactor unit and allowing said microbial consortium to reproduce during a diurnal cycle between a time period of 9 PM and 6 AM is controlled by said programmable logic controlled unit whereby said dewatered wastewater is diverted to other uses thereby reducing the hydraulic load on said wastewater plant and said highly concentrated microbial solution introduced into said flow channel functioning to modify the sewer biofilm.

13. The method of treating wastewater upstream of a wastewater treatment plant which reduces the hydraulic load of the wastewater treatment plant in combination with providing a highly concentrated microbial population according to claim 12 wherein said bacteria contains at least one facultative bacteria species.

14. The method of treating wastewater upstream of a wastewater treatment plant which reduces the hydraulic load of the wastewater treatment plant in combination with providing a highly concentrated bacterial population according to claim 12 further including the steps of de-nitrification, aerobic processing, membrane cleaning, or combinations thereof.

* * * * *